(12) United States Patent
Chen et al.

(10) Patent No.: US 10,468,893 B2
(45) Date of Patent: Nov. 5, 2019

(54) USB CHARGING METHOD HAVING PROTECTION FUNCTION

(71) Applicant: DELTA ELECTRONICS, INC., Taoyuan (TW)

(72) Inventors: Tien-He Chen, Taoyuan (TW); Shou-Chieh Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 359 days.

(21) Appl. No.: 15/227,534

(22) Filed: Aug. 3, 2016

(65) Prior Publication Data

US 2017/0054310 A1 Feb. 23, 2017

Related U.S. Application Data

(60) Provisional application No. 62/207,210, filed on Aug. 19, 2015.

(30) Foreign Application Priority Data

Apr. 7, 2016 (CN) .......................... 2016 1 0213101
Apr. 7, 2016 (TW) ............................. 105110843 A (51) Int. Cl.
 *H02J 7/00* (2006.01)
(52) U.S. Cl.
 CPC .......... *H02J 7/0029* (2013.01); *H02J 7/0042* (2013.01); *H02J 7/0068* (2013.01); *H02J 2007/0001* (2013.01)
(58) Field of Classification Search
 CPC ...... H02J 7/0029; H02J 7/0052; H02J 7/0054; H02J 7/0042; H02J 7/0068; H02J 7/0004; H02J 7/0011; H02J 7/0039; H02J 2007/0062; G06F 1/26; G06F 1/266
 USPC ........................................................ 320/106
 See application file for complete search history.

(56) References Cited

U.S. PATENT DOCUMENTS

| | | | |
|---|---|---|---|
| 9,590,510 B1* | 3/2017 | Sheng | H02M 3/33507 |
| 2010/0289457 A1* | 11/2010 | Onnerud | H02J 7/0093 320/162 |
| 2014/0036734 A1* | 2/2014 | Fong | G06F 13/4286 370/276 |
| 2015/0180244 A1* | 6/2015 | Jung | H02J 7/0055 320/107 |
| 2015/0270733 A1* | 9/2015 | Inha | H02J 7/0054 320/103 |
| 2016/0306616 A1* | 10/2016 | Tomppo | G06F 8/65 |
| 2016/0321195 A1* | 11/2016 | Ghosh | G06F 1/266 |
| 2016/0359349 A1* | 12/2016 | Todd | H02J 7/0044 |
| 2017/0005441 A1* | 1/2017 | Tsai | H01R 29/00 |

(Continued)

*Primary Examiner* — Nathaniel R Pelton
*Assistant Examiner* — Michael N Dibenedetto
(74) *Attorney, Agent, or Firm* — Hauptman Ham, LLP (57) ABSTRACT

A USB charging method adopted by an electronic source device and an electronic sink device electrically connected thereto through USB interface is present. The method comprises following steps: receiving a Discover Identity ACK from the sink device after connection; determining if the sink device is recorded in a protect list according to the Discover Identity ACK; adjusting voltage/current combinations which is to provide to the sink device according to a best working voltage of the sink device if the sink device is recorded in the protect list; transmitting the adjusted voltage/current combinations to the sink device.

9 Claims, 9 Drawing Sheets

(56) References Cited

U.S. PATENT DOCUMENTS

2017/0115711 A1* 4/2017 Jaramillo ................ G06F 1/266
2017/0117719 A1* 4/2017 Su ............................ G06F 1/00
2017/0293347 A1* 10/2017 Wood, III ........... G06F 13/4282

* cited by examiner

USB CHARGING METHOD HAVING PROTECTION FUNCTION

CROSS-REFERENCE TO RELATED APPLICATION

This patent application claims the benefit of U.S. Provisional Patent Application No. 62/207,210, filed Aug. 19, 2015; and claims priority to Taiwan patent application No. 105110843, filed Apr. 7, 2016; and claims priority to China patent application No. 201610213101.6, filed Apr. 7, 2016. The entire disclosures of the above applications are all incorporated herein by reference.

BACKGROUND OF THE INVENTION

1. Field of the Invention

The invention relates to a USB charging method, and in particular to a USB charging method having protection function.

2. Description of Prior Art

Since USB interface comprises plug-and-play characteristic and can output stable power (for example, USB 2.0 interface can provide 5V/0.5 A power), many electronic devices with lower power consumption, such as smart devices, MP3 players, set-top boxes, etc., use USB connector as substitute for traditional DC-Jack for power transmission.

Recently, USB Implementers Forum (USB IF) released a new USB interface named USB Type-C for USB 3.1 standard. Also, USB IF further released a new power transmission standard named USB Power Delivery (USB PD) for providing enough power for electronic devices with higher power consumption, such as Tablet PCs, laptop computers, PC's monitors, etc., through USB interface.

A USB Type-C connector compliant with USB PD standard can support output voltages of multi-stages, for example, 5V, 12V, 20V, etc. Further, with adjustable output currents, the USB Type-C connector can output power up to 100 W (20V/5 Å).

In view of the convenience of the USB PD standard, some electronic devices demanding higher power (such as laptop computers) are now using the USB Type-C connector to transmit power. However, if the firmware of these electronic devices are not optimized according to USB PD standard's characteristics, powering electronic source devices may output unsuitable power that is unsuitable to these electronic sink devices, and may cause damage.

Specifically, after receiving a power requirement ACK from a electronic source device (such as a power supply), an electronic sink device's firmware may inherently request the largest power provided by the electronic source device as a best solution for completing charging as soon as possible. However, the largest output voltage that the USB Type-C connector can support under USB PD standard is 20V, which may exceed a best working voltage that the electronic sink device can endure. In this scenario, if the firmware of the electronic sink device inherently request the largest power offered by the electronic source device after receiving the power requirement ACK, the electronic sink device may be burnt out.

Furthermore, most electronic sink devices use a power supply or a battery as power source, and have acceptable voltage upper limit settings for battery being larger than for power supply (ie. the electronic sink device would decrease output current received from the battery for stabilization). If the firmware of the electronic sink device is not optimized and is unable to recognize whether it is the power supply or the battery that sent the power requirement ACK, it may request an unsuitable output power and result in errors during its charging procedure.

SUMMARY

Herein describes a USB charging method having protection function, which can prevent an electronic source device from providing an unsuitable power which exceeds a best working voltage of an electronic sink device to the electronic sink device.

According to one aspect of the present invention, there is provided a USB charging method comprising the following steps: providing a source device and a sink device interconnected with each other through a USB Type-C interface supporting USB PD standard; detecting a configuration channel (CC) pin of a USB Type-C connector of the sink device; obtaining, from the sink device, a Discover Identity ACK comprising at least a Vendor ID (VID) and a Product ID (VID); determining, according to the VID and the PID, if the sink device is provided in a protect list; if the sink device is not provided in the protect list, transmitting a power option list to the sink device, wherein the power option list comprises all voltage/current combinations supported by the source device; if the sink device is provided in the protect list, obtaining a best working voltage of the sink device; generating an adjusted power option list by adjusting, according to the best working voltage, the voltage/current combinations provided in the protect list; and, transmitting the adjusted power option list to the sink device.

According to another aspect of the present invention, there is provided a USB charging method comprising the following steps: providing a source device and a sink device interconnected with each other through a USB Type-C interface supporting USB PD standard; detecting a CC pin of a USB Type-C connector of the sink device; obtaining a plurality of working voltage/current combinations of the sink device, in which one of the voltage/current combinations has a value of a best working voltage; generating a power option list comprising all voltage/current combinations supported by the source device; adjusting, according to the best working voltage, the power option list to generate an adjusted power option list; and transmitting the adjusted power option list to the sink device.

The source device may thus confirm the best working voltage of the sink device before stably providing power to the sink device, and delete from the provided options the voltage/current combination(s) which exceeds the best working voltage of the sink device. Therefore, when choosing the request power, the sink device is restricted to not being able to choose a voltage/current combination which the sink device cannot endure, so as to prevent the source device and/or the sink device from being damaged or burnt out after connection due to potential deficiency of their firmware.

DESCRIPTION OF THE EMBODIMENTS

In cooperation with the attached drawings, the technical contents and detailed description of the embodiments of the present invention are herein provided Referring to FIG. 1, a USB charging method having protection function (referred to as the charging method hereinafter) may be adopted by an electronic source device 1 and an electronic sink device 2 (referred to as the source device 1 and the sink device 2 hereinafter). The source device 1 and the sink device 2 are interconnected through a USB Type-C interface which supports USB Power Delivery (USB PD) standard.

Figure 1:
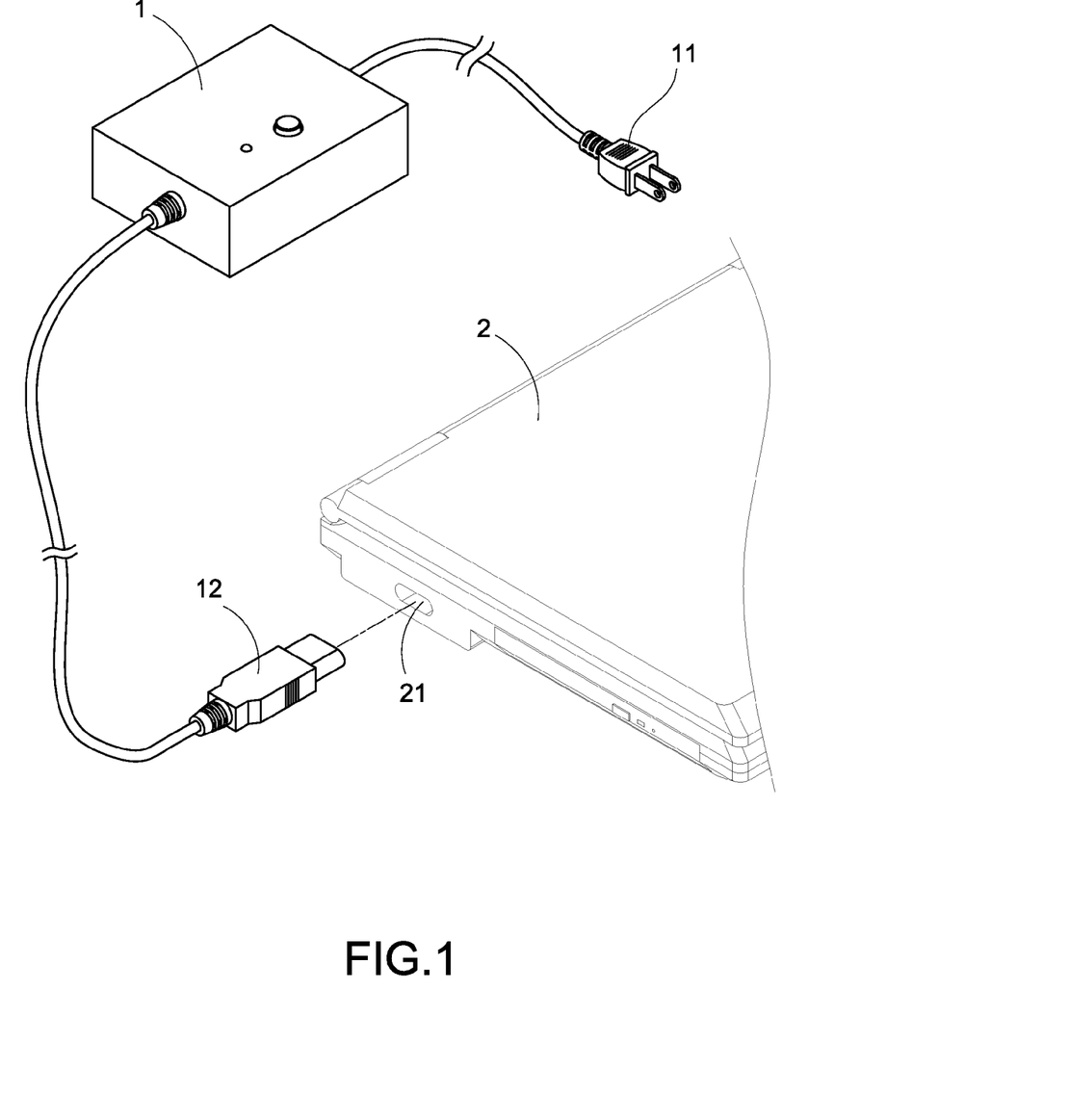
FIG. 1 shows a schematic view showing a power supply of a first embodiment according to the present invention.

Shown in FIG. 1, the source device 1 may be, for example, a power supply, and the sink device 2 may be, for example, a laptop computer. Alternatively, the source device 1 may include a battery, and the sink device 2 can be any portable device which can support USB PD standard. Shown in FIG. 1, the source device 1 has a power plug 11 at one end for connecting to supply mains, and has a USB Type-C male connector 12 at another end. The sink device 2 is configured with a USB Type-C female connector 21. Both the USB Type-C male connector 12 and the USB Type-C female connector 21 support the USB PD standard.

The source device 1 is connected with the USB Type-C female connector 21 of the sink device 2 through its USB Type-C male connector 12. In operation, when a configuration channel pin (CC pin) of the USB Type-C male connector 12 detects counterpart CC pin of the USB Type-C female connector 21, the source device 1 starts to provide power to the sink device 2 through other pins of the USB Type-C male connector 12 and the USB Type-C female connector 21.

The present charging method may be implemented by the sink device 2 to prevent the sink device 2 from being damaged or burnt out due to having received an unsuitable charging voltage level. For example, the sink device 2 may request the source device 1 to provide power, but the power exceeds a best working voltage of the sink device 2. The sink device 2 may have a deficiency, for example it may not be capable to know or to discriminate whether a power it is receiving (or requested to receive) exceeds the best working voltage of the sink device 2. For example, the best working voltage of the sink device 2 could be 14.8 V, but the source device 1 may provide a certain charging voltage level (such as 20V) which is higher than the level of the sink device 2's best working voltage and causing the sink device 2 to be damaged or burnt out. Accordingly, if the source device 1 provides power to the sink device 2 directly without the present charging method, it may damage the sink device 2 or make it inoperable.

Figure 2:
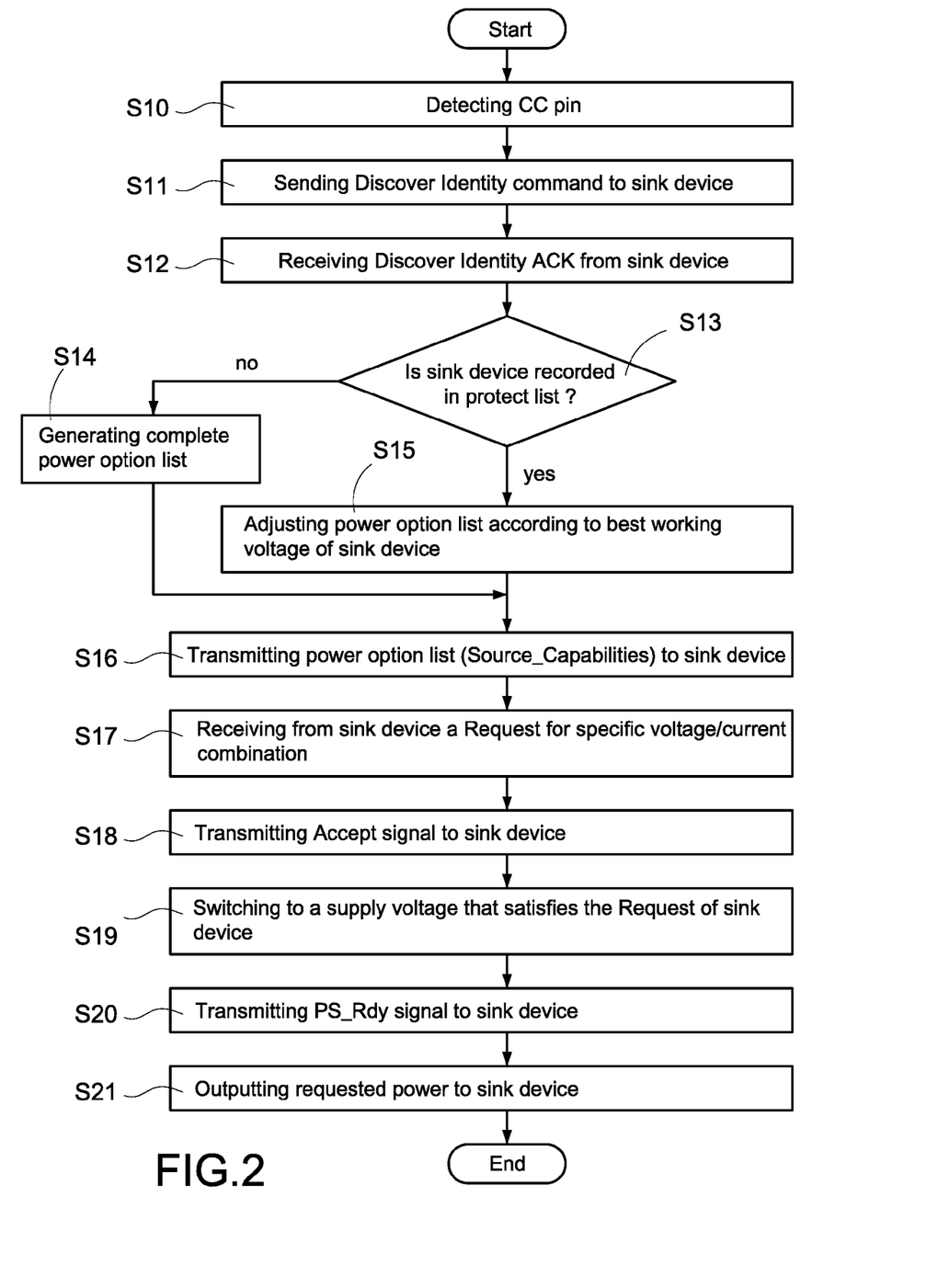
FIG. 2 shows a power supply flowchart of the first embodiment according to the present invention.

Referring to FIG. 2, after the source device 1 is connected to the sink device 2, it detects the CC pin of the USB Type-C female connector 21 of the sink device 2 (step S10) to confirm the success of the connection. It should be mentioned that while connecting with the sink device 2, the source device 1 provides a standard power (e.g. 5V/500 mA) to the sink device 2 immediately through VBus pins of USB Type-C interface.

After confirming the success of the connection, the source device 1 sends a Discover Identity command to the sink device 2 (step S11), and awaits to receive a Discover Identity ACK reply from the sink device 1 according to the Discover Identity command (step S12). The Discover Identity ACK may comprise at least a vendor ID (VID) and a product ID (PID) of the sink device 2.

After receiving the Discover Identity ACK (step S12), the source device 1 decodes the Discover Identity ACK to obtain the VID and the PID and based on the VID and the PID, determines if the sink device 2 is recorded in a protect list of the source device 1 (step S13). The protect list includes information of the VID, the PID and the best working voltage of the sink device 2, for example shown in the following table.

| VID | PID | Best Working Voltage |
|---|---|---|
| 0xV001 | 0xP001 | 14.8 V |
| 0xV001 | 0xP002 | 5 V |
| 0xV001 | 0xP003 | 19.2 V |
| 0xV002 | 0xP101 | 3.3 V |
| . | . | . |
| . | . | . |
| . | . | . |

If the source device 1, at the step S13, determines that the sink device 2 is not recorded in the protect list, it assumes that the sink device 2 is outside a default protection range of the source device 1 (for example, the sink device 2 may not have the aforementioned deficiency or may not need charging protection). Accordingly, the source device 1 generates a complete power option list (step S14), which records all voltage/current combinations supported by the source device 1. In one embodiment, the source device 1 supports multiple voltage/current combinations, such as a 5V/3 A combination, a 12V/3 A combination, a 15V/3 A combination, a 20V/2.25 A combination, etc., and the complete power option list records the multiple voltage/current combinations. In an alternative embodiment, the source device 1 can also support other voltage/current combinations such as a 5V/2 A (10 W) combination, a 12V/1.5 A (36 W) combination, a 12V/5 A (60 W) combination, a 20V/3 A (60 W) combination, a 20V/5 A (100 W) combination, etc. Other alternative embodiments are envisaged.

If the source device 1, at the step S13, determines that the sink device 2 is recorded in the protect list, it then adjusts the voltage/current combinations recorded in a complete power option list according to the best working voltage of the sink device 2 (step S15), and generates an adjusted power option list.

In step S15, the source device 1 obtains the best working voltage of the sink device 1 based on the VID and the PID of the sink device 2, and deletes from the complete power option list the voltage/current combination(s) which has the voltage exceeding a sum of the best working voltage (and a tolerance). In one of the demonstrated embodiments, the tolerance is 0.5V. The tolerance can also be set at other values.

In an example embodiment, if the best working voltage of the sink device 2 is 14.8V, then the 5V/3 A combination; the 12V/3 A combination; and the 15V/3 A combination will be kept in the adjusted power option list (because 5V, 12V and 15V are less than 15.3V (14.8V+0.5V tolerance)), and the 20V/2.25 A combination will be deleted from the adjusted power option list (because 20V is larger than 15.3V). In other words, after receiving the adjusted power option list, the sink device 2 is not allowed to request 20V/2.25 A power, and is protected from the risk of burning out.

Next, the source device 1 transmits the complete power option list or the adjusted power option list (referred to as Source_Capabilities) to the sink device 2 (step S16). After the step S16, the source device 1 receives from the sink device 2 a Request for a specific voltage/current combination (step S17), and if the request for the specific voltage/current combination is correct (for example, the source device 1 does support the specific voltage/current combination), the source device 1 transmits an Accept signal to the sink device 2 (step S18). After the step S18, the source device 1 switches its supply voltage from 5V of the standard power to a supply voltage that satisfies the Request of the sink device 2 (i.e., corresponding to the specific voltage/current combination) (step S19), and transmits a Power Supply Ready (PS_Rdy) signal to the sink device 2 after switching has completed (step S20).

After step S20, the source device 1 provides power to the sink device 2 through VBus pins, outputting the requested power to sink device 2 (step S21). Every time the source device 1 accepts the request for new power requirement from the sink device 2, it switches its supply voltage to satisfy the Request of the sink device 2 within a time limitation of USB PD standard, and then transmits the PS_Rdy signal to the sink device 2. Afterwards, the source device 1 outputs the requested power to the sink device 2 (step S21).

Figure 3:
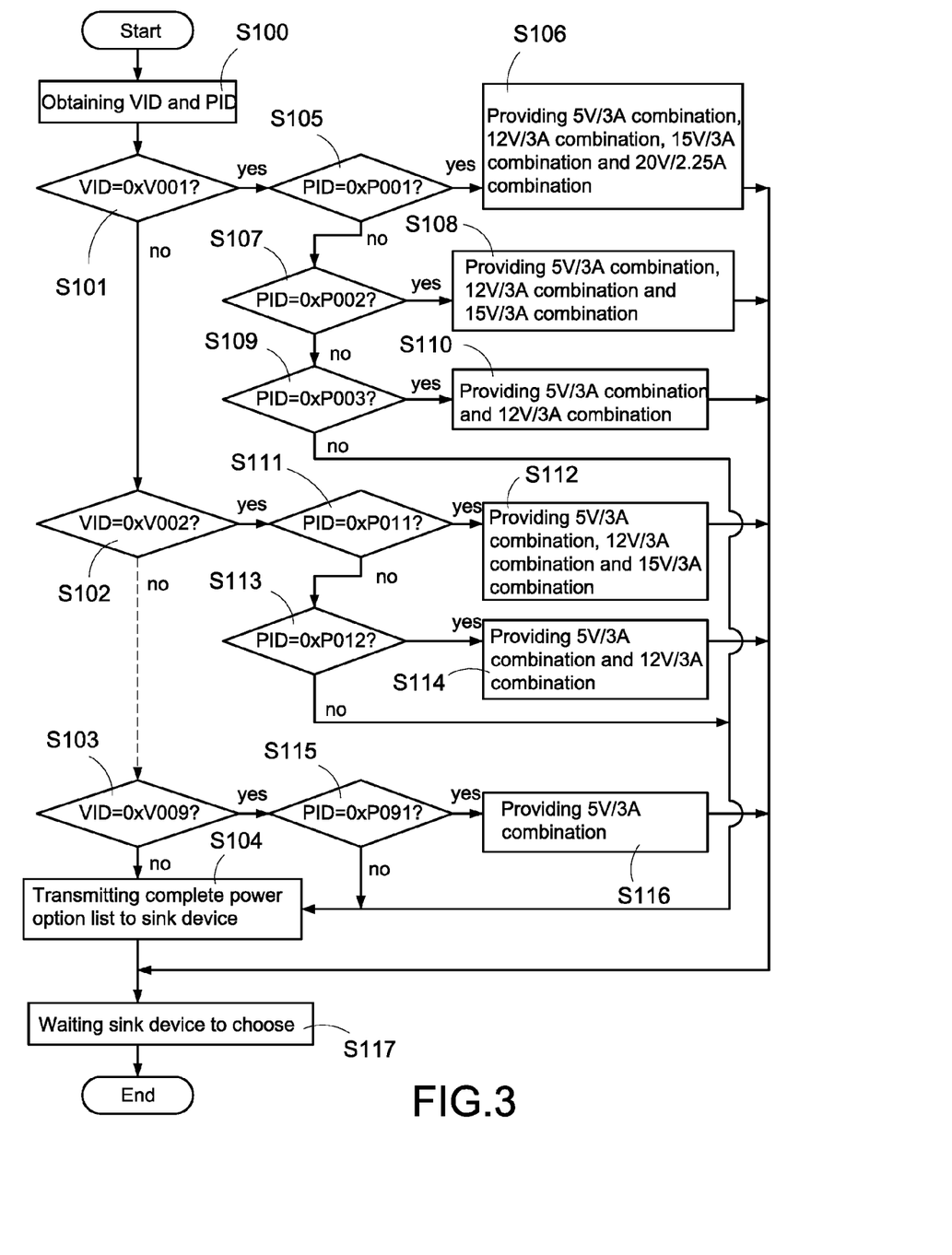
FIG. 3 shows a voltage/current combination adjusting flowchart of the first embodiment according to the present invention.

An example voltage/current combination adjusting method according to an embodiment of the present invention will now be described with reference to FIG. 3. Shown in FIG. 3, step S100 corresponds with step S12 of FIG. 2, when the source device 1 obtains the VID and the PID of the sink device 2. The source device 1 first ensures the content of the VID and determines if the VID is one of the identification codes recorded in the protect list, such as 0xV001 (step S101), 0xV002 (step S102), or 0xV009 (step S103), etc. If the VID is not in the protect list, the source device 1 directly transmits the complete power option list to the sink device (step S104).

If the VID is in the protect list, the source device 1 then determines the content of the PID, and adjusts the content of the power option list according to the PID. In the embodiment shown in FIG. 3, for VID=0xV001, if the PID is 0xP001 (step S105), the source device 1 adjusts the content of the power option list to comprise a 5V/3 A combination, a 12V/3 A combination, a 15V/3 A combination and a 20V/2.25 A combination (step S106); if the PID is 0xP002 (step S107), the source device 1 adjusts the content of the power option list to comprise the 5V/3 A combination, the 12V/3 A combination and the 15V/3 A combination (step S108); if the PID is 0xP003 (step S109), the source device 1 adjusts the content of the power option list to comprise the 5V/3 A combination and the 12V/3 A combination (step S110).

For VID=0xV002, if the PID is 0xP011 (step S111), the source device 1 adjusts the content of the power option list to comprise the 5V/3 A combination, the 12V/3 A combination and the 15V/3 A combination (step S112); if the PID is 0xP012 (step S113), the source device 1 adjusts the content of the power option list to comprise the 5V/3 A combination and the 12V/3 A combination (step S114).

For VID=0xV009 and the PID is 0xP091 (step S115), the source device 1 adjusts the content of the power option list to comprise only the 5V/3 A combination (step S116).

If the content of the power option list is adjusted and the adjusted power option list is generated, the source device 1 transmits the adjusted power option list to the sink device 2 and waits for the Request of the sink device (step S117), so as to execute the aforementioned step S17 to the step S21.

Figure 4A:
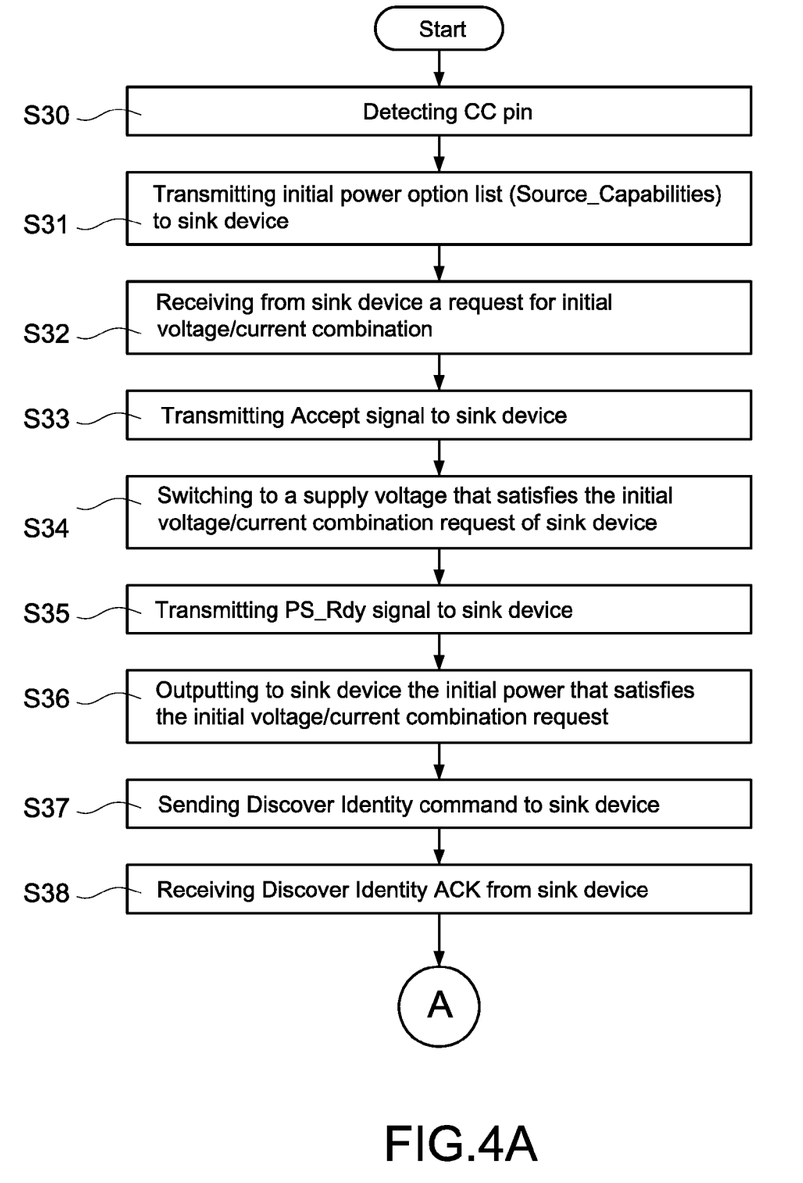
FIG. 4A shows a first part of a power supply flowchart of a second embodiment according to the present invention.
Figure 4B:
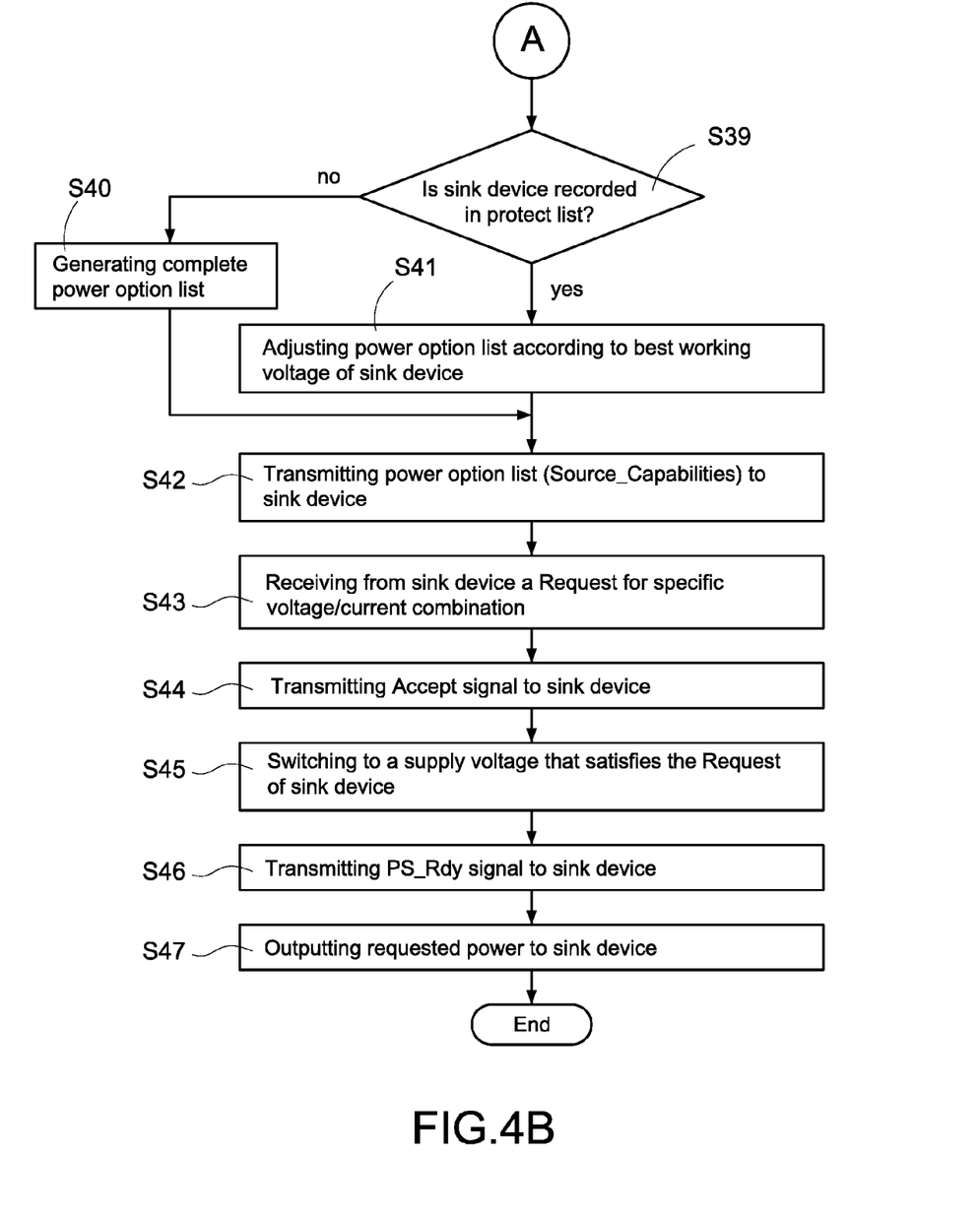
FIG. 4B shows a second part of a power supply flowchart of the second embodiment according to the present invention.

FIG. 4A and FIG. 4B show an alternative embodiment wherein the source device 1 does not directly transmit the Discover Identity command to the sink device 2 after the connection. First, the source device 1 is connected with the sink device 2 and detects the CC pin of the USB Type-C female connector 21 of the sink device 2 (step S30), so as to confirm the success of the connection. Next, the source device 1 transmits an initial power option list (referred to as Source_Capabilities) to the sink device 2 (step S31), so as to allow the sink device 2 to request an initial voltage/current combination according to the initial power option list.

In one of the exemplary embodiments, the initial power option list comprises a single initial voltage/current combination. In other words, the sink device 2 is only allowed to request only one initial voltage/current combination. In a preferred exemplary embodiment, the initial power option list only comprises a secure 5V/3 A combination. With this, the sink device 2 is protected from being burnt out by an initial power provided by the source device 1.

After the step S31, the source device 1 receives from the sink device 2 a request for the initial voltage/current combination (also referred to as an initial voltage/current combination request) according to the initial power option list (step S32). After confirming the initial voltage/current combination is correct, the source device 1 transmits the Accept signal to the sink device 2 (step S33). Afterwards, the source device 1 switches to a supply voltage that satisfies the initial voltage/current combination request of the sink device 2 (i.e., corresponding to the aforementioned initial voltage/current combination) (step S34), and transmits the PS_Rdy signal to the sink device 2 after switching has completed (step S35). After the step S35, the source device 1 outputs to the sink device 2 the initial power that satisfies the initial voltage/current combination request (step S36), wherein the initial power corresponds to the initial voltage/current combination.

After the step S36, the source device 1 executes step S37 and step S38 to discover the Identity of the sink device 2. By having already provided the initial voltage/current combination, the sink device 2 is assured in receiving the Discover Identity command accurately. Following the inquiring of the identity of the sink device 2, steps 39 to S47 as shown in FIG. 4B is performed, for adjusting the power option list according to the identity of the sink device 2; providing the adjusted power option list to the sink device 2 for conducting selection by the sink device 2; receiving from the sink device 2 a Request for the specific voltage/current combination; accepting the Request and, if the requested specific voltage/current combination is supported by the source device 1, switching to a supply voltage based on the specific voltage/current combination; and continuing to provide output power to the sink device 2 according to the switched supply voltage. The steps S37 to S47 are similar to the previously described steps S11 to S21 shown in FIG. 1.

Figure 5:
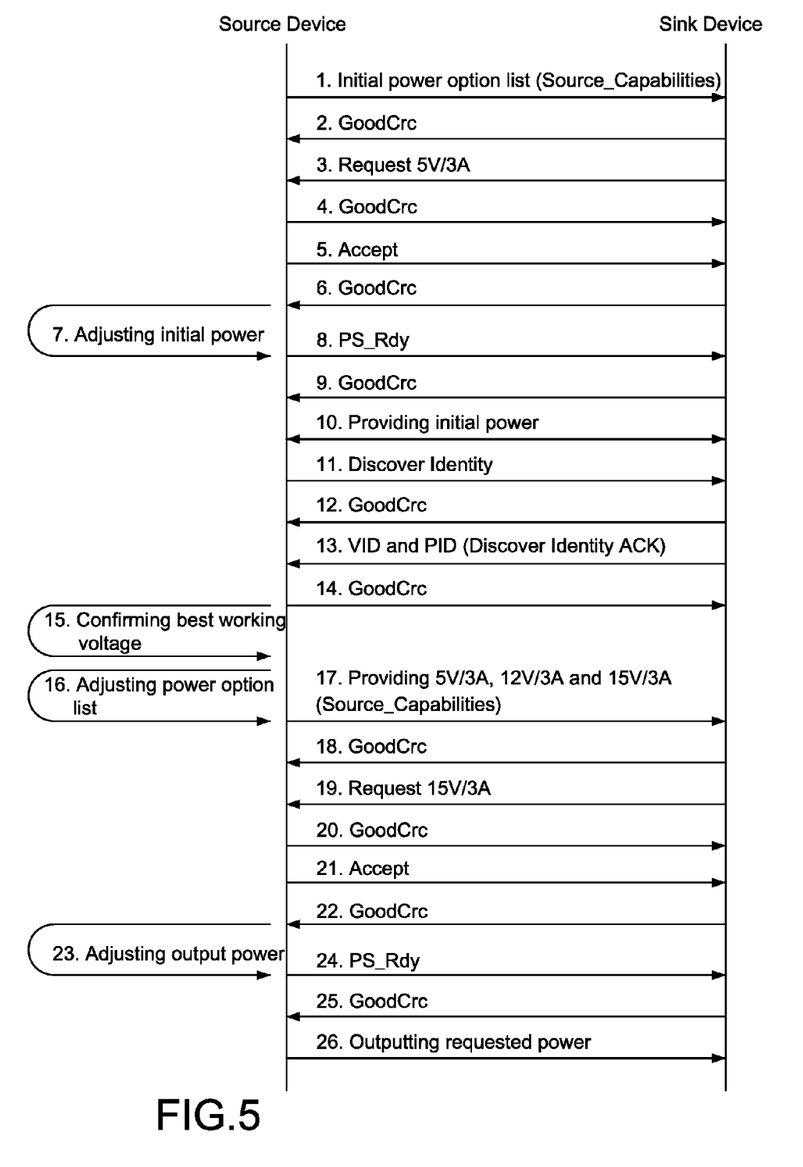
FIG. 5 shows another power supply flowchart of the second embodiment according to the present invention.

FIG. 5 uses a timeline to show the power supply flow and communications between the Source Device 1 and the Sink Device 2 of the embodiment shown in FIG. 4A and FIG. 4B.

First, the source device 1 transmits the initial power option list (Source_Capabilities) to the sink device 2, and then receives a GoodCrc signal reply from the sink device 2. Next, the sink device 2 sends to the source device 1 a Request for the initial voltage/current combination (5V/3 A), and the source device 1 then replies a GoodCrc signal to the sink device 2. Next, the source device 1 transmits the Accept signal to the sink device 2, and receives a GoodCrc signal from the source device 2.

Next, the source device 1 adjusts the voltage/current of the initial power to be provided to sink device 2. After the adjustment, the source device 1 transmits the PS_Rdy signal to the sink device 2, and receives a GoodCrc signal reply from the sink device 2. Afterwards, the source device 1 provides the initial power to the sink device 2 and maintains the provision of the initial power to the sink device 2.

After initial power is being provided, the source device 1 transmits the Discover Identity to the sink device 2, and receives a GoodCrc signal reply from the sink device 2. Next, the sink device 2 sends to source device 1 the Discover Identity ACK which comprises the VID and the PID. The source device 1 then replies a GoodCrc signal to the sink device 2 after receiving the Discover Identity ACK (VID and PID).

Next, the source device 1 confirms the best working voltage for the sink device 2, and adjusts the content of the power option list according to the best working voltage of the sink device 2. After completing the adjustment, the source device 1 transmits the adjusted power option list (for example, comprising a 5V/3 A combination, a 12V/3 A combination and a 15V/3 A combination) to the sink device 2, and receives a GoodCrc reply from the sink device 2. The sink device 2 then sends to the source device 1 a Request for the specific voltage/current combination (such as the 15V/3 A combination), and the source device 1 then replies a GoodCrc signal to the sink device 2 after receiving the Request.

The source device 1, accepting the specific voltage/current combination request from sink device 2, then sends the Accept signal to the sink device 2, and receives a GoodCrc signal reply from the sink device 2. Next, the source device 1 adjusts the voltage/current of the output power according to the specific voltage/current combination and transmits the PS_Rdy signal to the sink device 2 after the adjustment has completed, and receives a GoodCrc signal reply from the sink device 2. Afterwards, the source device 1 provides to the sink device 2 the output power that satisfies the Request of the sink device 2 and maintains the power output to the sink device 2.

Figure 6A:
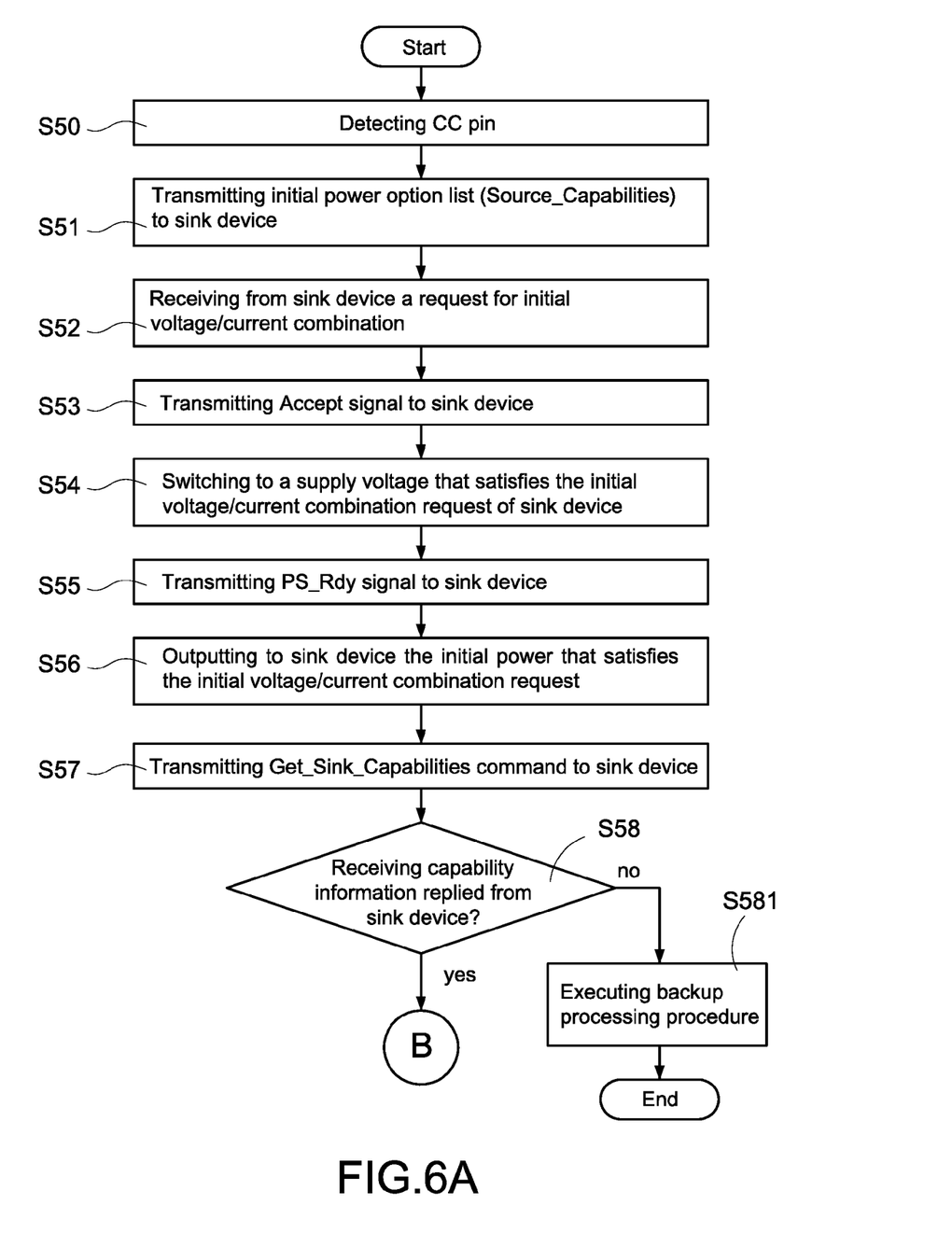
FIG. 6A shows a first part of a power supply flowchart of a third embodiment according to the present invention.
Figure 6B:
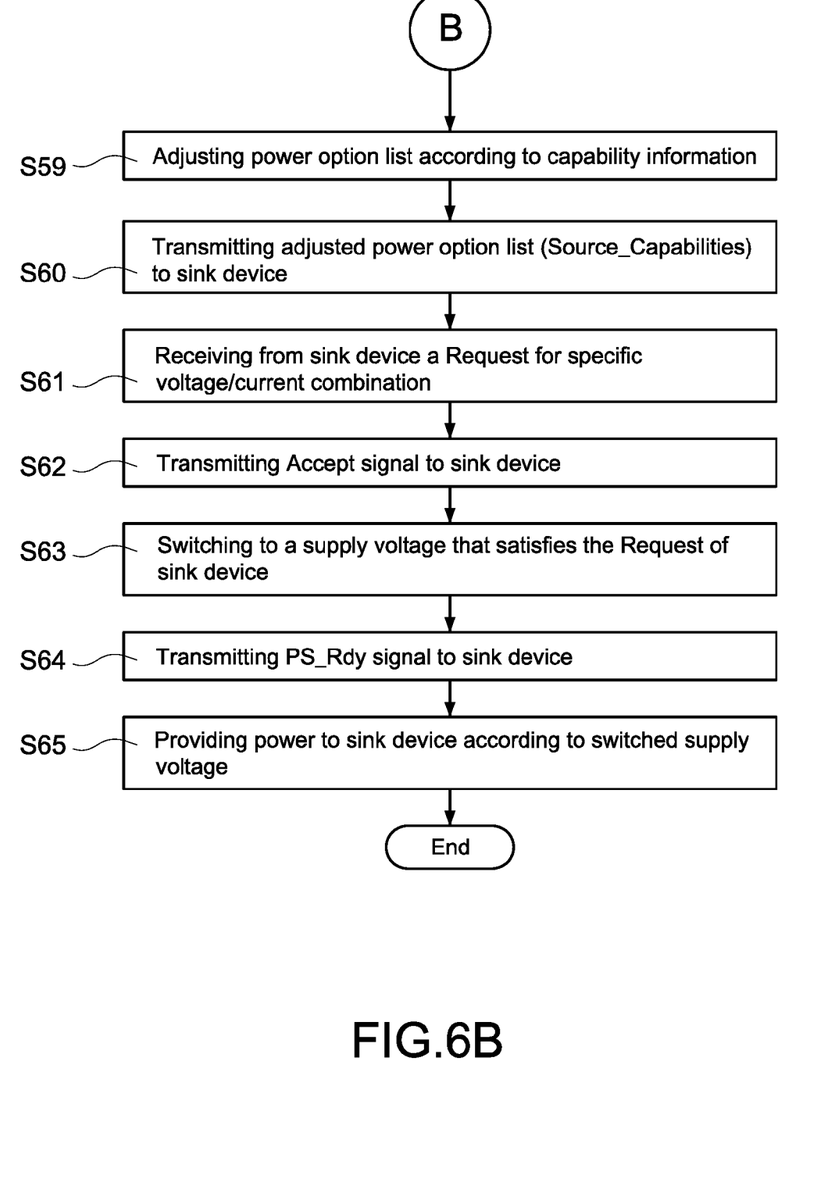
FIG. 6B shows a second part of a power supply flowchart of the third embodiment according to the present invention.

Referring to FIG. 6A and FIG. 6B, an alternative embodiment according to the present invention is provided, wherein the charging method adjusts the content of the power option list according to a Get_Sink_Capabilities command Shown in this embodiment, the source device 1 provides the initial power to the sink device 2 to make sure the sink device 2 can receive commands accurately (i.e. the steps S51 to S56 of FIG. 6A are performed), then transmits the Get_Sink_Capabilities command to the sink device 2. Alternatively, the source device 1 can transmit the Get_Sink_Capabilities command to the sink device 2 immediately after being connected with the sink device 2 (i.e. steps S51 to S56 of FIG. 6A are not performed).

As shown in FIG. 6A, the source device 1 is connected to the sink device 2 and detects the CC pin of the USB Type-C female connector 21 of the sink device 2 (step S50), so as to confirm the success of the connection. Next, the source device 1 transmits the initial power option list (referred to as Source_Capabilities) to the sink device 2 (step S51), and receives from the sink device 2 the request for the initial voltage/current combination (refers to as the initial voltage/current combination request) according to the initial power option list (step S52). In this embodiment, the initial power option list only comprises a single voltage/current combination (a secure 5V/3 A combination is a preferred combination, but other combinations are envisaged).

At step S53, the source device 1 transmits the Accept signal to the sink device 2 after confirming the requested initial voltage/current combination is acceptable. Then, at the step S54, the source device 1 switches to a supply voltage that satisfies the initial voltage/current combination request of the sink device 2 (i.e. corresponding to the aforementioned initial voltage/current combination), and at step S55 the PS_Rdy signal is transmitted to the sink device 2 after switching has completed. After the sink device 2 receives the PS_Rdy signal, the source device 1 begins outputting to the sink device the initial power that satisfies the initial voltage/current combination request according to the switched supply voltage (step S56).

After the step S56, the source device 1 has assured the sink device 2 is assured to accurately receive commands. The source device 1 can then transmit the Get_Sink_Capabilities command to the sink device 2 (step S57), and awaits receipt of a capability information (referred to as Sink_Capabilities) reply from the sink device 2 (step S58).

If the source device 1 does not receive the capability information reply from the sink device 2 (e.g. if the sink device 2 does not reply, or the sink device 2 replies a signal which is not the capability information), the source device 1 then executes a backup processing procedure (step S581). The backup processing procedure is similar to the step S40 of the aforementioned embodiment shown in FIG. 4B, which generates the complete power option list and switches the supply voltage to outputting the request-satisfied power as described in the steps S42 to S47.

Referring to FIG. 6B following FIG. 6A, after receiving the capability information reply from the sink device 2, the source device 1 adjusts the content of the power option list according to the capability information (step S59), and generates the adjusted power option list. The capability information may comprise multiple working voltage/working current combinations which are adoptable by the sink device 2, and the multiple working voltages comprise the best working voltage of the sink device 2. The power option list may comprise all voltage/current combinations supported by the source device 1 (for example, the 5V/3 A combination, the 12V/3 A combination, the 15V/3 A combination and the 20V/2.25 A combination). In the step S59, the source device 1 may use the preferred working voltage recorded in the capability information to adjust the content of the power option list.

Further, the source device 1 may delete the voltage/current combination(s) which exceeds a sum of the best working voltage (and a tolerance, for example 0.5V) from the power option list. Tolerance values other than 0.5V may also be used.

After the step S59, the source device 1 transmits the adjusted power option list (referred to as Source_Capabilities) to the sink device 2 (step S60), and receives from the sink device 2 the Request for the specific voltage/current combination according to the adjusted power option list (step S61). Next, the source device 1 confirms that the specific voltage/current combination is correct and supportable, and transmits to the sink device 2 the Accept signal according to the specific voltage/current combination (step S62). Next, the source device 1 may immediately switch to a supply voltage that satisfies the Request of the sink device 2 according to the specific voltage/current combination (step S63), and transmits the PS_Rdy signal to the sink device 2 after it completes the switching (step S64). Afterwards, the source device 1 provides power to the sink device 2 according to the switched supply voltage (step S65).

Figure 7:
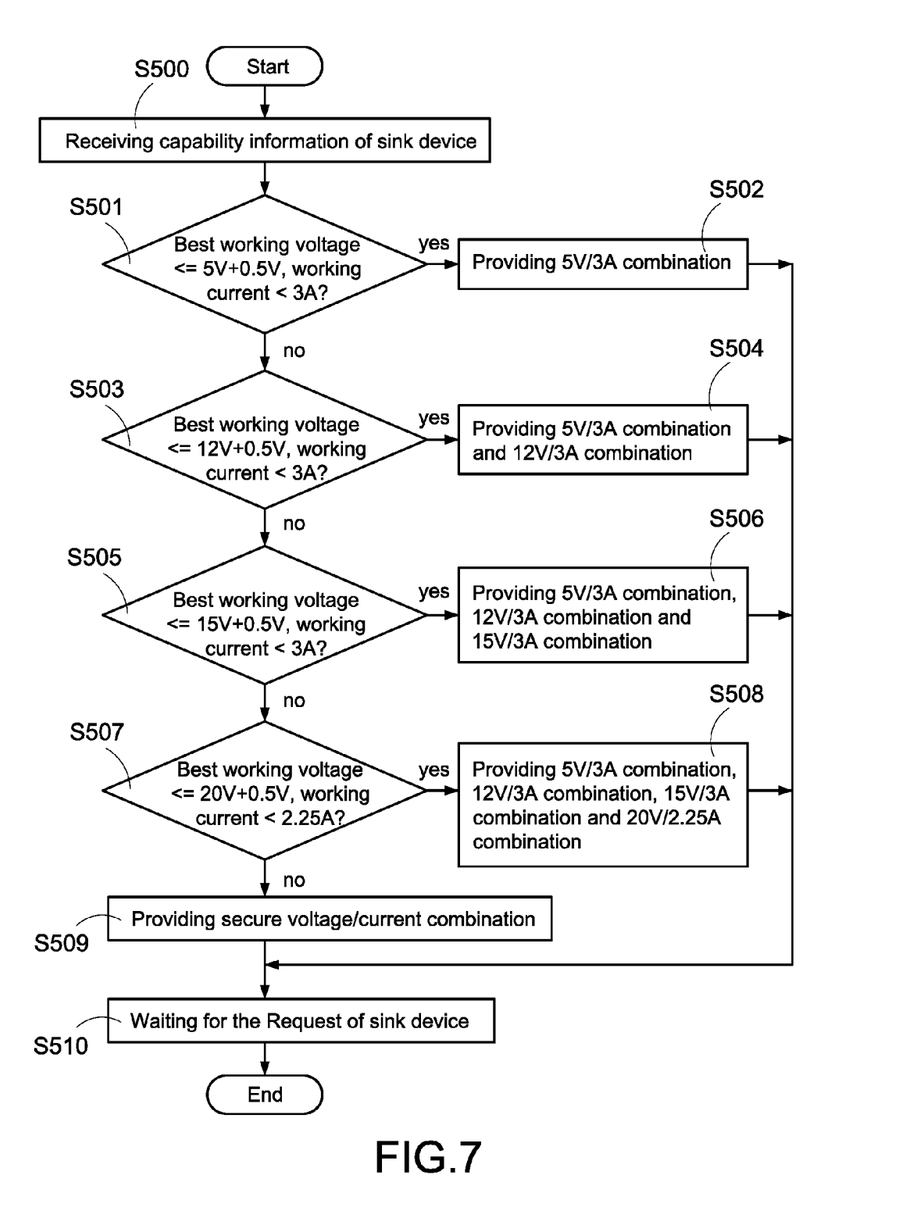
FIG. 7 shows a voltage/current combination adjusting flowchart of the second embodiment according to the present invention.

FIG. 7 shows an alternative method for adjusting the content of the power option list.

When receiving the capability information of the sink device 2 at the aforementioned step S500 (corresponding to step S58 shown in FIG. 6A), the source device 1 determines if the best working voltage of the sink device 2 is less than or equal to a sum of 5V (and the tolerance, for example 0.5V). Also, the source device 1 determines if the working current of the sink device 2 is less than 3 A (step S501). If the determination is "yes" at the step S501, the source device 1 then adjusts the content of the power option list to comprise a 5V/3 A combination (step S502).

If the determination is "no" at the step S501, the source device 1 then determines if the best working voltage of the sink device 2 is less than or equal to a sum of 12V (and the tolerance for example 0.5V), and if the working current of the sink device 2 is less than 3 A (step S503). If the determination is "yes" at the step S503, the source device 1 then adjusts the content of the power option list to comprise a 5V/3 A combination and a 12V/3 A combination (step S504).

If the determination is "no" at the step S503, the source device 1 then determines if the best working voltage of the sink device 2 is less than or equal to a sum of 15V (and the tolerance for example 0.5V), and if the working current of the sink device 2 is less than 3 A (step S505). If the determination is "yes" at the step S505, the source device 1 then adjusts the content of the power option list to comprise a 5V/3 A combination, a 12V/3 A combination and a 15V/3 A combination (step S506).

If the determination is "no" at the step S505, the source device 1 then determines if the best working voltage of the sink device 2 is less than or equal to a sum of 20V (and the tolerance for example 0.5V), and if the working current of the sink device 2 is less than 2.25 A (step S507). If the determination is "yes" at the step S507, the source device 1 then adjusts the content of the power option list to comprise a 5V/3 A combination, a 12V/3 A combination, a 15V/3 A combination and a 20V/2.25 A combination (step S508).

If the determination is "no" at the step S507, it may mean that the sink device 2 is an electronic device with special specifications. In order to protect the sink device 2 from being damaged, the source device 1 adjusts the content of the power option list to comprise only a secure voltage/current combination (step S509). For example, the secure voltage/current combination may be a 5V/3 A combination.

After the power option list adjustment has completed, the source device 1 transmits the adjusted power option list to the sink device 2, and waits for the Request of the sink device 2 (step S510), after which the aforementioned step S61 to the step S65 are performed.

By using the charging method described, the sink device can be protected from being burnt out due to an unoptimized firmware of the sink device asking the source device to provide power which exceeds a best working voltage of the sink device.

As the skilled person will appreciate, various changes and modifications can be made to the described embodiments. is the present disclosure is intended to include all such variations, modifications and equivalents which fall within the scope of the present invention as defined by the accompanying claims.

What is claimed is:

1. A USB charging method having a protection function, the USB charging method comprising:
   a) providing a source device and a sink device interconnected with each other through a USB Type-C interface supporting USB PD standard;
   b) detecting a configuration channel (CC) pin of a USB Type-C connector of the sink device;
   b1) providing an initial power option list to the sink device, wherein the initial power option list only comprises an initial voltage/current combination;
   b2) receiving, from the sink device, a request for the initial voltage/current combination;
   b3) transmitting, to the sink device, an Accept signal in response to the request for the initial voltage/current combination;
   b4) switching the source device to a supply voltage that satisfies the initial voltage/current combination;
   b5) transmitting a Power Supply Ready (PS_Rdy) signal to the sink device; and
   b6) providing, according to the switched supply voltage, an initial power to the sink device, wherein the initial power corresponds to the initial voltage/current combination;
   c) obtaining a plurality of working voltage/current combinations of the sink device, wherein the plurality of working voltage/current combinations comprise at least a value of a best working voltage;
   d) generating a power option list comprising all voltage/current combinations supported by the source device;
   e) adjusting, according to the best working voltage, the power option list to generate an adjusted power option list, comprising:
   e1) if the best working voltage does not exceed a sum of 5V and a tolerance, and if the working current is less than 3 A, adjusting the power option list to comprise a 5V/3 A combination;
   e2) if the best working voltage does not exceed a sum of 12V and the tolerance, and if the working current is less than 3 A, adjusting the power option list to comprise the 5V/3 A combination and a 12V/3 A combination;
   e3) if the best working voltage does not exceed a sum of 15V and the tolerance, and if the working current is less than 3 A, adjusting the power option list to comprise the 5V/3 A combination, the 12V/3 A combination and a 15V/3 A combination; and
   e4) if the best working voltage does not exceed a sum of 20V and the tolerance, and if the working current is less than 2.25 A, adjusting the power option list to comprise the 5V/3 A combination, the 12V/3 A combination, the 15V/3 A combination and a 20V/2.25 A; and
   f) transmitting the adjusted power option list to the sink device.

2. The USB charging method in claim 1, wherein the power option list comprises a 5V/3 A combination; a 12V/3 A combination; a 15V/3 A combination; and a 20V/2.25 A combination.

3. The USB charging method of claim 1, wherein the initial voltage/current combination is a 5V/3 A combination.

4. The USB charging method of claim 1, wherein the step d, the voltage of each voltage/current combination in the adjusted power option list does not exceed a sum of the best working voltage and a tolerance.

5. The USB charging method of claim 4, wherein the tolerance is 0.5V.

6. The USB charging method of claim 1, wherein step d) further comprises a step d5) adjusting the power option list to comprise a secure voltage/current combination if the best working voltage exceeds the sum of 20V and the tolerance.

7. The USB charging method of claim 6, wherein the secure voltage/current combination is a 5V/3A combination.

8. The USB charging method of claim 1, wherein the tolerance is 0.5V.

9. The USB charging method of claim 1, wherein the source device is a power supply and the sink device is a laptop computer.

* * * * *